United States Patent

Wood

[15] 3,684,898

[45] Aug. 15, 1972

[54] GATE DRIVE FOR THYRISTORS AT HIGH POTENTIALS

[72] Inventor: Peter Wood, Murrysville, Pa.

[73] Assignee: Westinghouse Electric Corporation, Pittsburgh, Pa.

[22] Filed: March 29, 1971

[21] Appl. No.: 128,732

[52] U.S. Cl.................307/252 N, 307/255, 307/268, 307/311, 323/43.55

[51] Int. Cl.........................H03k 17/00, H03k 17/56

[58] Field of Search..307/252 N, 311, 262, 268, 254, 307/255; 323/43.55, 45

[56] References Cited

UNITED STATES PATENTS 3,305,765 2/1967 Rittner...................307/252 N 3,473,084 10/1969 Dodge...................307/311 X

*Primary Examiner*—John Zazworsky

*Attorney*—A. T. Stratton and F. E. Browder

[57] ABSTRACT

A drive circuit for gating controllable rectifiers. Two channels are used, one for the transfer of the energy for the gate signal and its associated switching components, the other for the transfer of the timing sequence information to control the gate drive circuit. The energy channel uses current transformers operating back-to-back to transfer the energy to the gate drive circuit. The control channel employs a photosensitive diode which is irradiated by a light source to control the gate drive circuit.

7 Claims, 1 Drawing Figure

PATENTED AUG 15 1972
3,684,898
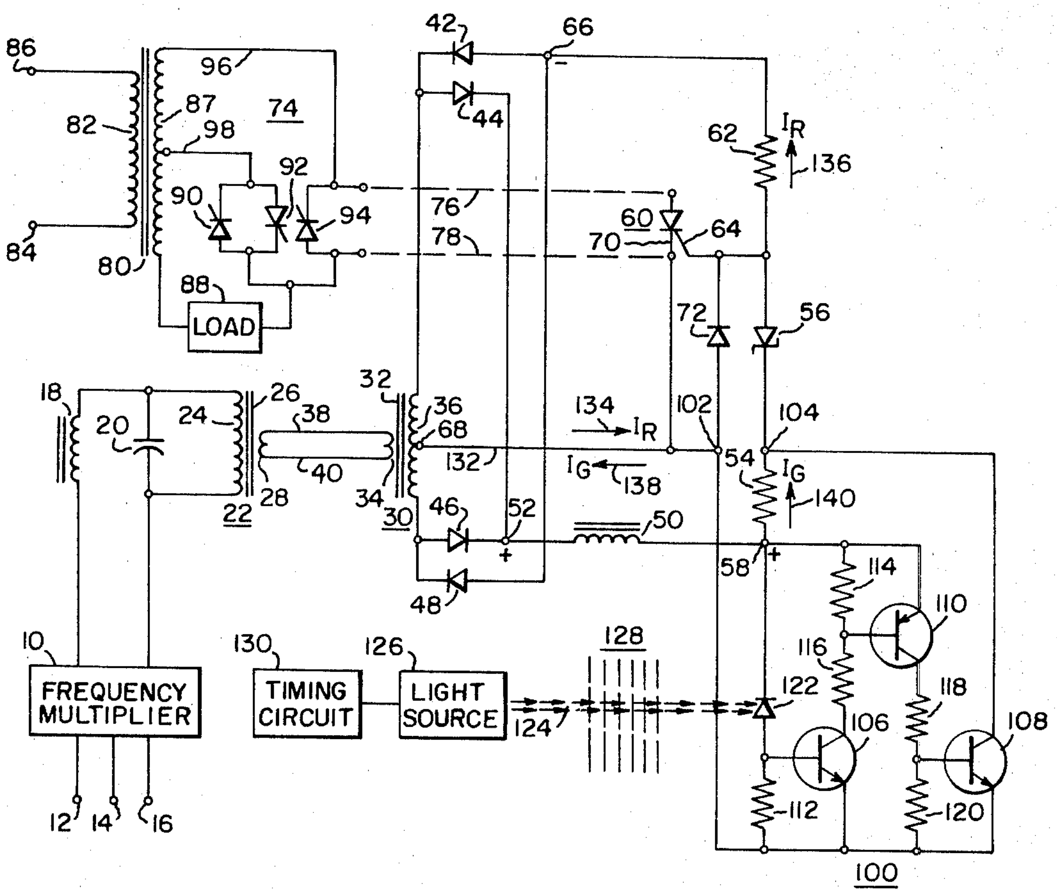
WITNESSES:
Bernard R. Gieguay
John R. Hanway
INVENTOR
Peter Wood
BY
E. Browdy
ATTORNEY

GATE DRIVE FOR THYRISTORS AT HIGH POTENTIALS

BACKGROUND OF THE INVENTION

1. Field of the Invention

This invention relates in general to electrical control apparatus, and more particularly to the control of controllable rectifying elements which are operated at high potentials.

2. Description of the Prior Art

Controllable rectifiers are used in a wide variety of electrical power and control apparatus. The silicon controlled rectifier, or SCR, is used extensively in switching and regulating circuits which operate at moderate voltage levels. When used in applications such as high voltage transformer tap changing and high voltage DC regulating, the SCR is operated at a high potential which required special control circuitry to supply the gating signal. Since it is impractical to operate the pulse timing circuits at the high potential level of the SCR, a means must be employed which isolates the SCR potential level from the pulse timing circuitry.

It is also important in high voltage SCR operation to provide a gating signal which has a relatively fast rise time with sufficiently high amplitude. Since the controlled circuit is often operating at high potential and current levels, a plurality of SCR elements usually are connected in a series, parallel or series-parallel configuration. If each SCR is not fired at substantially the same time, a particular SCR in the circuit may instantaneously carry a greater share of the load and damage to the SCR may result. It is well known that a gating signal having a fast rise time with a high amplitude reduces the difference in the firing time of different SCRs in the same circuit.

Transferring the gating signal from the timing circuit to the SCR is one of the major problems associated with SCR operation at high voltage levels. Many prior art methods have used potential transformers to pass the timing signal information and energy while isolating the high voltage on the SCR from the timing circuit. This method has certain disadvantages due to the inherent inability of energy transformers to pass the high frequency components of a fast rising pulse wave. Various methods have been proposed whereby the energy used to gate the SCR is transferred over one channel and the timing information or control signal is transferred over another channel. Increasing availability of photosensitive diodes and photo-emitting diodes has made the use of optical control channels attractive. The physical and electrical separation of the two elements provides adequate voltage isolation and readily permits transmission of a steep pulse signal.

Although some methods derive the energy for the gating pulse directly from the high potential surrounding the SCR when used in HVDC applications, various AC switching and regulating applications do not permit the pulse energy to be derived from the SCR potential. It is therefore desirable to provide a relatively simple and economic method of gating SCRs used in various high voltage applications with a high amplitude and fast rise time pulse.

SUMMARY OF THE INVENTION

This invention discloses a new and improved method of gating SCR's which are operating at high potentials. The energy for the gating pulse is transmitted across an energy channel by a current transformer arrangement which is coupled to a constant current energy source. The energy channel produces a DC voltage with constant current characteristics which supplies energy for the SCR gating pulse and the associated control components. The control of the pulse energy is accomplished over an optical control channel utilizing a photosensitive diode. A reverse bias voltage is applied to the gating electrode of the SCR when no gating pulse is present. Since the energy for the gating pulse and the control switching circuit is derived from the constant current energy channel, this invention is applicable to AC and DC SCR systems.

BRIEF DESCRIPTION OF THE DRAWING

Further advantages and uses of the invention will become more apparent when considered in view of the following detailed description and drawing, in which the single FIGURE is a schematic diagram of a gate drive circuit constructed according to the teachings of this invention.

DESCRIPTION OF THE PREFERRED EMBODIMENTS

Referring to the drawing, there is shown a frequency multiplier 10 which is connected to a constant voltage AC source at terminals 12, 14 and 16. Although other devices may be used for frequency conversion, the frequency multiplier 10 shown is a magnetic type having a single phase output voltage and a three phase input voltage. Assuming that the AC voltage applied to the frequency multiplier 10 is 60 Hertz, the AC output voltage will have a frequency of 180 Hertz if the frequency is tripled by the multiplier 10. Since the circuit herein described will function effectively with other frequencies, the 180 Hertz output voltage of the frequency multiplier 10 is illustrative rather than limiting. The 180 Hertz frequency is a practical value which compromises the use of relatively low frequency inductive apparatus while maintaining sufficiently high ripple frequency for filtering convenience.

The output of the frequency multiplier is connected to a series combination of an inductor 18 and a capacitor 20. A current transformer 22, comprising a low current winding 24, a high current winding 28, and a magnetic core 26, is connected with the low current winding 24 in parallel with the capacitor 20. The relatively constant voltage output of the frequency multiplier 10 produces a relatively constant current in the low current winding 24 of the transformer 22.

A transformer 30 comprising a magnetic core 32, a high current primary winding 34 and a low current secondary center tapped winding 36, has its high current primary winding 34 connected to the high current winding 28 of the transformer 22 by conductors 38 and 40. Due to the isolation provided by the transformer 30, the "floating" potential on the low current winding 36 is not applied to the high current winding 34, conductors 38 and 40, transformer 22 and its associated energy supplying components. Therefore, the energy source is conveniently maintained at near ground potential while supplying energy from the low current winding 36 which may be at a relatively high potential with respect to ground.

The rectifying elements 42, 44, 46 and 48 may be silicon diodes and are connected in a full wave bridge rectifying circuit across the low current winding 36 as shown. The current from the positive potential terminal 52 is conducted through an inductor 50 to remove objectionable ripple components. A resistor 54 and an avalanche diode 56 are connected between the positive potential DC voltage terminal 58 and the gating electrode 64 of the rectifying element 60 being controlled. A resistor 62 is connected between the gating electrode 64 and the negative potential DC voltage terminal 66. The center tap 68 of the low current winding 36 is connected to the cathode electrode 70 of the controllable rectifier 60. A diode 72 is connected between the electrodes 64 and 70 of the controllable rectifier 60 and is poled as shown.

The controllable rectifier 60 may be a silicon controlled rectifier, or SCR, and may be connected into an external circuit to provide a controlled rectifying means. The tap changer circuit 74 is shown with dotted lines 76 and 78 indicating how the controllable rectifier 60 could be connected into the circuit. The tap changer circuit 74 comprises a transformer with a magnetic core 80, a primary winding 82 with leads 84 and 86 for connection to an AC energy source, a secondary tapped winding 87, a load represented by lock 88, and SCRs 90, 92 and 94 connected as shown. In this basic circuit, each SCR 90, 92, 94 and 60 may be controlled by an external control circuit, however, for simplicity the control circuitry connected to SCRs 90, 92 and 94 is not shown. The SCRs may be controlled to conduct or resist current flow and effectively apply the load 88 to the secondary winding 87 through lead 96 or tap 98.

The SCR 60 may be used in conjunction with other forms of tap changing circuitry or in combination with a plurality of other SCRs connected in series, parallel or series-parallel. The SCR 60 may also be used in conjunction with a HVDC system to control the magnitude of the output voltage from the system. In general, the gate drive circuit described herein is applicable to any circuit requiring control of its rectifying or switching element by a gating signal. The circuit described herein is adaptable particularly for use in circuits where a high potential exists on the rectifying element being controlled.

A cascade switching circuit 100 is connected to the terminal 102 of the diode 72 and to the terminal 104 which is located between the avalanche diode 56 and the resistor 54. Power is supplied to the switching circuit 100 by connection to the positive potential DC voltage terminal 58. The switching circuit comprises NPN transistors 106 and 108, a PNP transistor 110, resistors 112, 114, 116, 118, and 120, and a photosensitive diode 122. The switching circuit 100 can be modified by replacing the PNP transistor 110 with an NPN transistor and interchanging the emitter and collector electrodes. The switching circuit 100 functions to provide two states, one "on" and the other "off". When the switching circuit 100 is "on" the terminals 102 and 104 are effectively connected together; when the switching circuit is "off" the terminals 102 and 104 remain electrically separate.

Activation of the switching circuit 100 is accomplished by the change in the characteristics of the photosensitive diode 122 when irradiated with electromagnetic energy in or near the visible spectrum. When irradiated, the diode 122 conducts current in its reverse direction causing the voltage across the resistor 112 to increase and turn the transistor 106 "on". This increases the voltage across the resistor 114 and turns the transistor 110 "on". The voltage across the resistor 120 increases and turns the transistor 108 "on" which effectively connects the terminals 102 and 104 together. The photosensitive diode 122 may be of the silicon PIN type.

The electromagnetic energy path 124 is directed between the diode 122 and the electromagnetic energy source 126 by a suitable means. An optical lens system or a system using plastic or glass fibers could be used. The medium 128 which separates the photosensitive diode 122 and the electromagnetic energy source 126 may be comprised of a vacuum, a gas, a translucent solid, or a translucent liquid such as that used to increase the dielectric and cooling properties of the apparatus involved. When using fiber optic techniques, the optical properties of the separating medium 128 are not important. The electromagnetic energy source may be a photoemitting diode, such as a gallium arsinide or a gallium phosphide diode, or any other means for supplying pulse energy which may be detected by the photosensitive diode 122. The particular pulsing sequence or repetition rate required for proper operation of the SCR is developed by the timing circuit 130 which controls the energy source 126. The cascade switching circuit 100, including the photosensitive diode 122, may be fabricated on a single silicon chip using integrated circuit technology.

It is convenient, in discussing the operation of this invention, to refer to two branch currents. One current, $I_R$, flows through the center tap conductor 132, indicated by arrow 134, and through the resistor 62, indicated by arrow 136. The other current, $I_G$, flows through the center tap conductor 132, indicated by arrow 138, and through the resistor 54, indicated by arrow 140. When the timing sequence is such that the photo-sensitive diode 122 is irradiated, the switching circuit 100 is turned "on" and the terminals 102 and 104 are effectively connected together. This causes the current $I_G$ to flow from the terminal 104 to the terminal 102 and through the center tap conductor 132. Negligible current flows through the avalanche diode 56 since the voltage across it is insufficient to produce the avalanche effect. Since the resistance of the resistor 62 is much greater than the resistance of the resistor 54, the diode 72 does not conduct any substantial amount of the current $I_G$ through the resistor 62. The current $I_R$ flows through the diode 72 and the resistor 62 developing a voltage across the diode 72 which reverse biases the gating electrode 64 of the SCR 60. This reverse bias voltage prevents conduction of the SCR 60, enhances the system noise immunity and improves the recovery conditions of the SCR.

When the photosensitive diode 122 is not irradiated, the switching circuit 100 is turned "off" and the terminals 102 and 104 are not effectively connected. The voltage developed across the avalanche diode 56 is now sufficient to breakdown the diode 56 and current $I_G$ flows through the avalanche diode 56, the gating circuit of the SCR 60, and the center tap conductor 132. The SCR 60 is gated for conduction under this condition. Since the switching circuit 100 operates substantially instantaneously, the pulse of current applied to the gating circuit of the SCR 60 has a short rise time and relatively high magnitude.

I claim as my invention:

1. A circuit for driving the gate of a controllable element, said circuit comprising an energy transferring means, said energy transferring means isolating the potential of the energy receiving components from the energy supplying components, switching means which controls the energy transferred to the gate of said controllable element from said energy transferring means, said switching means comprising solid state amplifying elements which are powered from energy transferred by said energy transferring means, activating means for activating said switching means, said activating means comprising a source of electromagnetic radiation and a means for detecting electromagnetic radiation, a gating network having a first and a second state, said network being switched from the first state to the second state by said switching means, said gating network providing during the first state a voltage across the gate which is being driven which will permit conduction of the controllable element, and said gating network providing during the second state a reverse bias voltage across the gate which is being driven which will prohibit conduction of the controllable element.

2. The circuit of claim 1 wherein the energy transferring means comprises a first and a second current transformer, said transformers each having a primary or high current winding and a secondary or low current winding, said primary windings of said first and second transformers being electrically connected, said secondary winding of said first transformer being connected to means creating a substantially constant current through said secondary winding of said first transformer, said secondary winding of said second transformer being center tapped and connected to rectifying means.

3. The circuit of claim 1 wherein the means for detecting electromagnetic energy comprises a photosensitive diode.

4. The circuit of claim 2 wherein the means creating a substantially constant current through said secondary winding of said first transformer comprises a magnetic frequency multiplier, inductive and capacitive elements serially connected across the output of said magnetic frequency multiplier, said secondary winding of said first transformer being connected across said capacitive element.

5. The circuit of claim 2 wherein the gating network comprises a first and a second current path, said first path being between the positive potential terminal of the rectifying means and the center tap of the secondary winding of the second transformer, said second path being between the center tap of the secondary winding of the second transformer and the negative potential terminal of the rectifying means, said first path having two intermediate terminals, an avalanche diode and the gating electrode of the controllable element being serially connected between said intermediate terminals of said first path, the switching means being connected between said intermediate terminals of said first path, said switching means providing a current path which bypasses the gating electrode and said avalanche diode when the switching means is activated, said second path having two intermediate terminals, a diode and the gating electrodes of the controllable element being connected in parallel between said intermediate terminals of said second path, said intermediate terminals of said second path having a voltage therebetween which reverse biases the controllable element when the switching means is not activated.

6. A circuit for driving the gate electrode of a controllable element, said circuit comprising a magnetic frequency multiplier having input and output terminals, a first inductor and a capacitor serially connected across said output terminals, a first current transformer having a low current and a high current winding, said low current winding being connected across said capacitor, a second current transformer with a low current and a high current winding, said high current windings of said first and second current transformers being connected together, said low current winding of said second current transformer having two output terminals and a center tap terminal, a full wave bridge rectifying means connected between said output terminals thereby providing a positive potential terminal and a negative potential terminal, a circuit connected between said positive potential terminal and said center tap terminal, said circuit connected between said positive potential terminal and said center tap terminal comprising the combination of a second inductor, a first resistor and an avalanche diode connected in series with each other and in series circuit relationship with a parallel circuit comprising a diode and the gating electrode of said controllable element, a second resistor connected between said negative potential terminal and a terminal between said avalanche diode and said parallel combination of the diode and the gating electrode of the controllable element, switching means comprising a cascade transistor circuit which derives its operating power from the DC voltage provided by said rectifying means, said switching means having two output terminals, one of said output terminals being connected to said center tap terminal, the other said output terminal being connected to a terminal between said avalanche diode and said first resistor, and said switching means comprising a photosensitive diode which is irradiated by electromagnetic energy to control the activation of said switching means.

7. Alternating current tap changing apparatus comprising the gate electrode driving circuit of claim 6, a transformer having a tapped winding, controllable rectifying elements connecting said tapped winding to a load, at least one of said controllable rectifying elements being gated by said gate driving circuit.

* * * * *